JOHN HOUPT.

Improvement in Steam-Engines.

No. 4,374. Reissued May 9, 1871.

Witnesses:
Benj Morrison
Wm H. Morrison.

Inventor.
John Houpt

AM. PHOTO-LITHOGRAPHIC CO. N.Y. (OSBORNE'S PROCESS)

United States Patent Office.

JOHN HOUPT, OF SPRINGTOWN, PENNSYLVANIA.

Letters Patent No. 90,265, dated May 18, 1869; reissue No, 4,374, dated May 9, 1871.

IMPROVEMENT IN STEAM-ENGINES.

The Schedule referred to in these Letters Patent and making part of the same.

I, JOHN HOUPT, of Springtown, in the county of Bucks and State of Pennsylvania, have invented certain Improvements in Steam-Engines, of which the following is a specification.

*Nature and Objects of the Invention.*

My invention consists of apparatus, hereinafter fully described, for superheating and equalizing the pressure of the exhaust-steam of a high-pressure steam-engine, to be again used in driving a second engine.

*Description of the Accompanying Drawing.*

Figure 1:
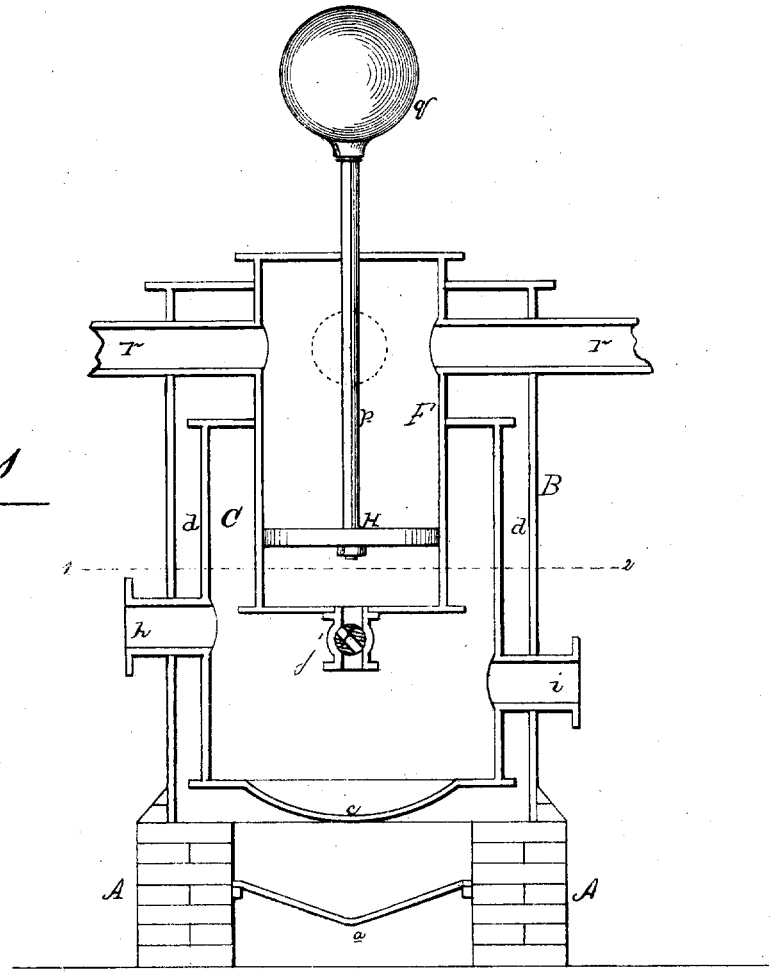
Figure 2:
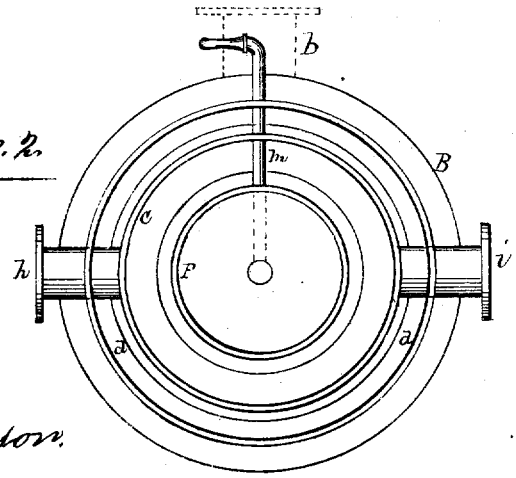

Figure 1 is a sectional elevation of apparatus constructed according to my invention, and Figure 2 a sectional plan view of the same on the line 1 2, fig. 1.

*General Description.*

A A represent the side walls of a furnace, between which are the usual grate-bars, *a*, and resting upon the top of this furnace, directly over the fire-place, is an upright cylindrical casing, B, closed at the top, and furnished with a pipe, *b*, fig. 2, through which the smoke and other products of combustion can pass to the chimney.

A cylindrical reservoir, C, of a diameter less than that of the casing B, is suspended within the latter in such a position that its curved bottom *c* shall be in close proximity to the fire, and so that an annular space, *d*, shall intervene between its sides and the said casing.

Two pipes, *h* and *i*, pass through the outer casing B, at points about opposite to each other, and communicate with the interior of the reservoir C, for a purpose described hereinafter.

F is a cylinder, which is contained partly within the reservoir C and partly within the casing B, it being closed at the top, but open at the bottom, where there is a pipe, *j*, provided with a valve or stop-cock, *l*, which is operated from without the casing by a rod, *m*, fig. 2.

A piston, H, is arranged to slide freely within the cylinder F, its rod *p* passing through the upper end of the said cylinder and having secured to it a weight, *q*.

Two pipes, *r r*, open at their outer ends, communicate with the interior of the cylinder F, at a point above the casing *c*, and may, if desired, be provided with suitable cocks, or with valves opening outward.

The operation of the apparatus is as follows:

The exhaust-steam of a high-pressure engine, which it is desired to use a second time in driving a low-pressure condensing-engine, is admitted into the reservoir C through the pipe *h*, and passes from the same through the pipe *i*.

As the exhaust-steam is received directly from the engine in a series of puffs of varying pressure, it is essential that this pressure should be equalized before it is permitted to pass from the reservoir.

It is also necessary, in order to prevent the partial condensation of the steam, and consequent lowering of the pressure, that the reservoir should be effectually heated, for which purpose it is placed over the furnace A, and entirely surrounded by the heated gases, &c., arising from the same.

This plan also enables me to superheat the steam, if desired.

As the steam within the reservoir has free access to the interior of the cylinder F, through the opening in the cock *l*, it will, as its volume increases, have a tendency to raise the piston H, which, however, actuated by its ball, *q*, will bear downward with a pressure proportionate to the weight of the said ball, and will thus maintain the steam at an even pressure, providing always that there be a sufficient quantity of steam to slightly raise the piston H.

The object of the cock *l* is to so regulate the passage of steam into the cylinder F as to prevent it from raising the piston too suddenly.

If steam should continue to enter the reservoir, without being at the same time drawn off from the same, through the pipe *i*, the pressure would not be increased, as the piston H would gradually rise to such a point as to permit the surplus steam to pass off through the pipes *r r*.

In this way all liability to accident arising from an increase of pressure in the reservoir is prevented.

It should be understood that the pipe *h* is provided with a valve opening toward the reservoir, so that there shall be no back pressure from the latter to interfere with the operation of the first or high-pressure engine.

Instead of having a separate furnace to heat the reservoir, the same result might be attained by causing the heated products of combustion from the boiler-furnace to pass through the casing B and around the said reservoir.

*Claims.*

I claim as my invention—

1. A steam-reservoir, provided with inlet and outlet-pipes *h* and *i*, communicating with a cylinder, in which is a weighted piston, H, and surrounded by a casing or jacket, B, through which heated products of combustion are arranged to pass, all substantially as hereinbefore described.

2. A pipe, *r*, arranged in respect to the cylinder F and its piston, as specified.

3. In the described combination of steam-cylinders of high and low pressure, and apparatus for superheating, a supplemental cylinder with piston, in combination with said superheater, whereby a varying amount of steam can be retained at an even pressure, substantially as set forth, to be again used for driving a second engine.

Witnesses:

BENJ. MORISON,

WM. H. MORISON.

JOHN HOUPT.